March 23, 1943.   D. J. ORR   2,314,552
SCALE STRUCTURE FOR VEHICLES
Filed Sept. 29, 1941   2 Sheets-Sheet 1
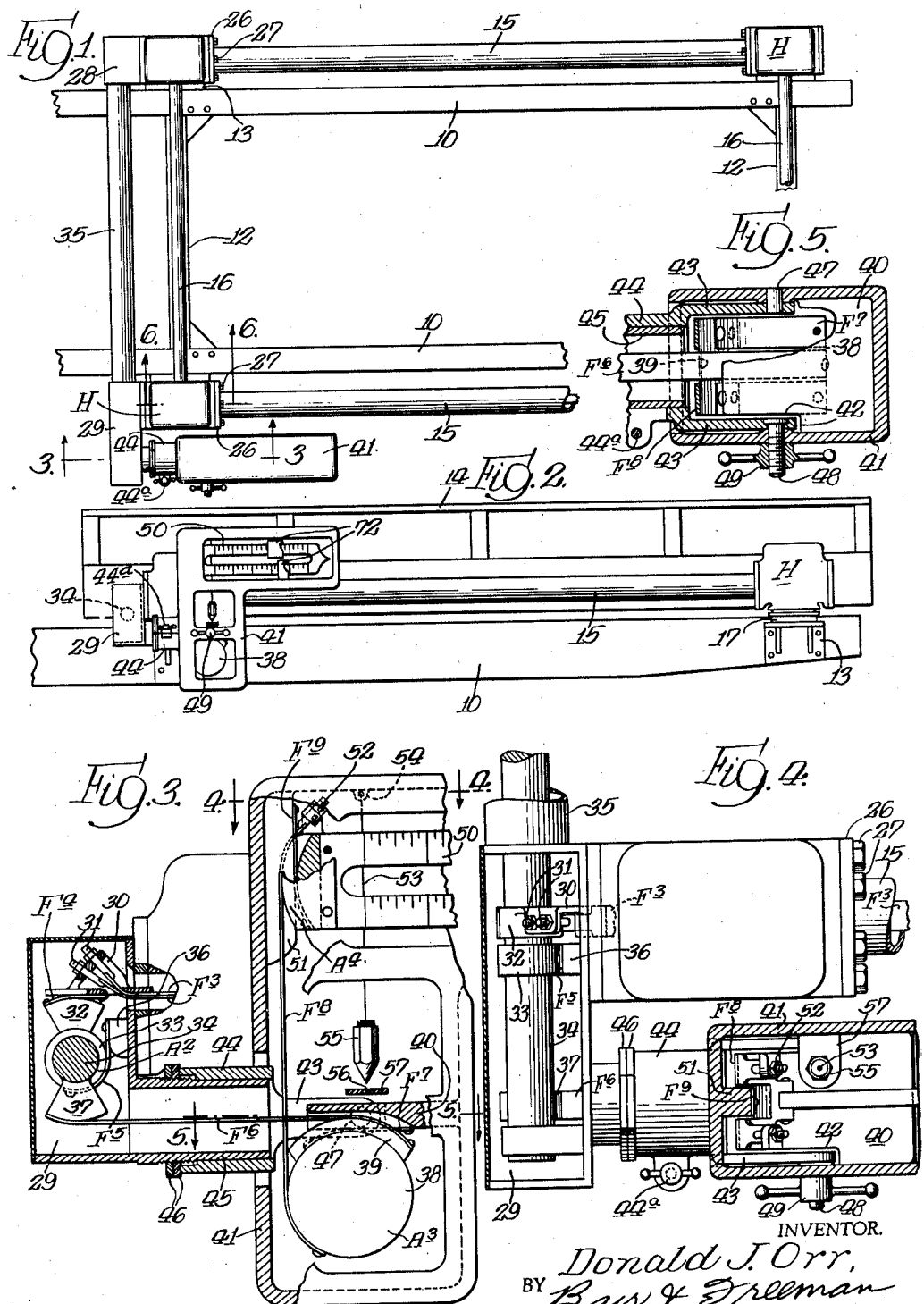
INVENTOR.
Donald J. Orr,
BY Bair & Freeman
Attys.

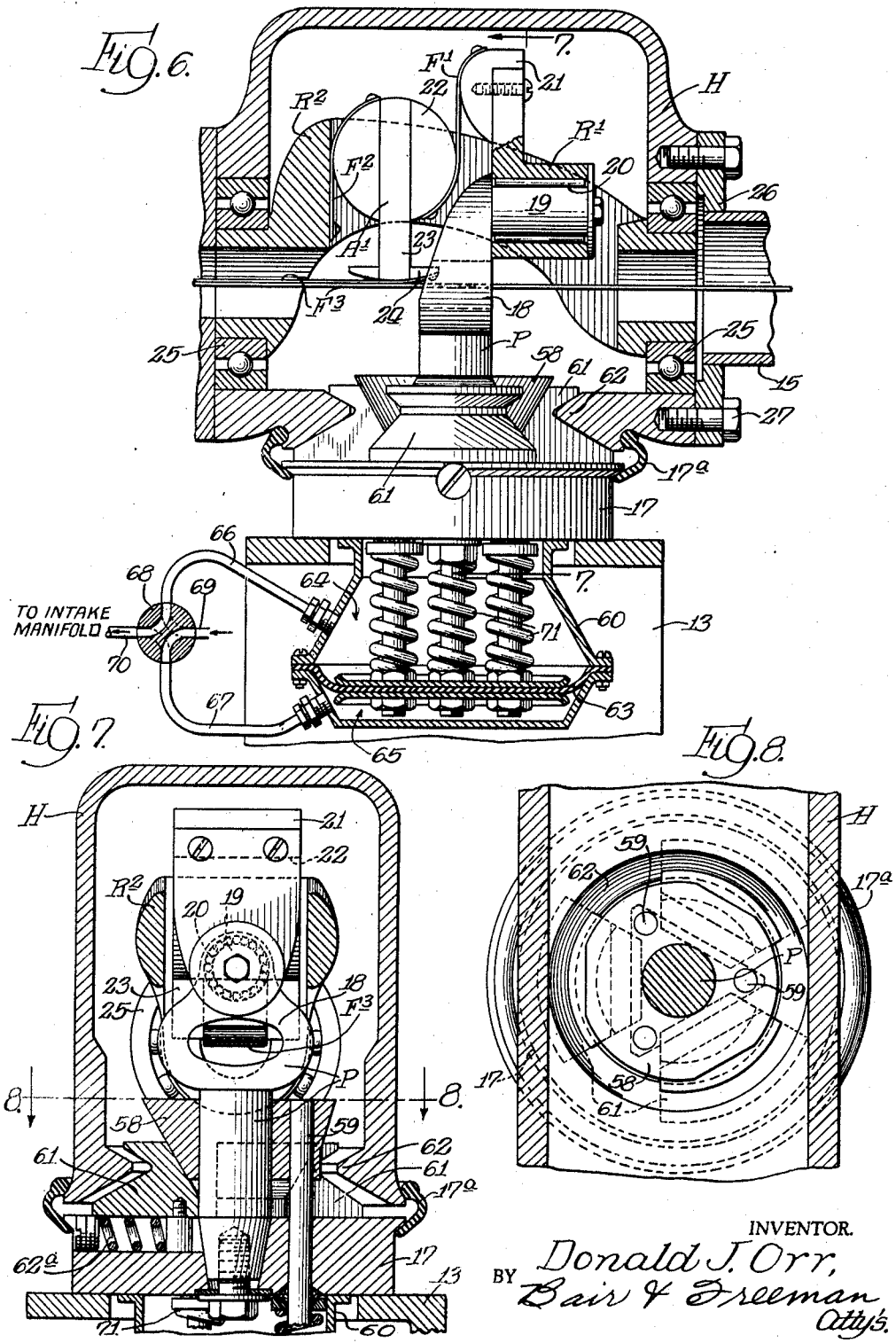

Patented Mar. 23, 1943

2,314,552

UNITED STATES PATENT OFFICE 2,314,552

SCALE STRUCTURE FOR VEHICLES

Donald J. Orr, Arnolds Park, Iowa

Application September 29, 1941, Serial No. 412,826

13 Claims. (Cl. 265—49)

This invention relates to a scale structure which may be permanently mounted as an integral part of a vehicle, such as a truck or the like, and it may be used when desired to support the load on the truck relative to the chassis so as to weigh the load thereon, or during transit may be used to lock the load rigidly with respect to the chassis, thereby removing the load from the scale beam except during weighing operations.

One object of the invention is to provide a structure which may be interposed between a vehicle chassis and its load in a very simple manner so as to facilitate installation of the scale structure.

A further object is to provide a scale structure which utilizes flexible elements such as steel ribbons to transmit the load on a load supporting frame to a scale beam so that the load can be weighed when desired.

A further object is to provide means for locking the load with respect to the chassis consisting of wedge devices and means to retain them in their engaged positions by utilizing the vacuum created in the intake manifold of the engine.

Still a further object is to provide a scale structure designed to compensate for any positioning of the load at an other-than-level position, such as when the truck is standing on a surface that is not level.

Still a further object is to provide a scale beam structure included as part of my scale structure and mounted so that it can be leveled to secure accurate measurements.

With these and other objects in view, my invention consists in the construction, arrangement and combination of the various parts of my device whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a plan view of my scale structure for vehicles, with one of the four corner units omitted to conserve space on the drawing;

Figure 2 is a side elevation of my scale structure;

Figure 3 is an enlarged sectional view on the line 3—3 of Figure 1;

Figure 4 is an enlarged plan of the lower left corner of Figure 1, with parts of the scale beam housing shown in section on the line 4—4 of Figure 3;

Figure 5 is a sectional view on the line 5—5 of Figure 3;

Figure 6 is an enlarged sectional view on the line 6—6 of Figure 1;

Figure 7 is a sectional view on the line 7—7 of Figure 6, and

Figure 8 is a sectional view on the line 8—8 of Figure 7.

On the accompanying drawings, I have used the reference numeral 10 to indicate the longitudinal members of a chassis of a vehicle, such as a truck or the like. Cross members 12 are shown connecting the members 10 together.

Four brackets 13 are mounted on the chassis frame members 10 adjacent each of the four corners of a platform 14 to be mounted on my scale structure and to support whatever load is carried by the truck. The truck body, of course, is usually of the enclosed type, but the walls and roof are omitted from the drawings.

I provide a frame consisting of four housings H adapted to be supported over the brackets 13 and connected together by longitudinal tubes 15 and transverse tubes 16. The platform 14 is mounted on the frame consisting of the elements H, 15 and 16.

Extending upwardly from each bracket 13 is a post P, the lower half of which post is a shank mounted in a plate 17 secured to the bracket 13. The upper half of each post P has an eye portion indicated at 18, and terminates at its upper end in a stud 19. A rocker $R^1$ is mounted on the stud 19 with needle bearings 20 interposed between the stud and the rocker.

A mounting member 21 is provided on the upper end of each rocker $R^1$, to which is secured a flexible element $F^1$. The flexible member $F^1$ supports an arcuate member $A^1$ in the form of a roller section 22, an arm 23 and a rocker shoe 24. A second flexible element $F^2$ in turn is supported by the roller section 22, as shown in Figure 6, and supports a rocker $R^2$. The rocker $R^2$ has its central portion in the form of a closed yoke surrounding the elements 19, $R^1$ and $A^1$ and has its ends journaled in ball bearings 25. The ball bearings 25 are supported in the housings H, which in turn have flanges 26 secured thereto as by bolts 27. The flanges 26 are welded to the ends of the tubes 15. The tubes 16 are welded directly to the housings H.

Flexible elements $F^3$ are secured to the rocker shoes 24 and are arranged so that two lower flexible elements F³ extend from the rocker shoes 24 in the two rear housings H at the right of Figure 1, then through the front housing H at the left of Figure 1 and into housings indicated at 28 and 29. Two upper flexible elements F³ also extend from the front rocker shoes 24 in the housings H at the left of Figure 1 and into the housings 28 and 29.

In the housings 28 and 29, the flexible elements F³ extend through adjusting blocks 30 (see Figure 3) and are connected with adjusting screws 31. The block 30 are mounted by flexible elements F⁴ connected with the upper sectors 32 of two arcuate elements A², one mounted in the housing 28 and the other in the housing 29. Each arcuate element A² has a ring-shaped portion 33 on a rock shaft 34 which extends through a connecting tube 35 from one of the arcuate elements A² to the other one. The rock shaft 34 and the arcuate elements A² are supported by flexible elements F⁵ connected with brackets 36 mounted in the housings 28 and 29.

In a housing 29, the arcuate element A² also has a lower sector 37 connected by a flexible element F⁶ with a third arcuate element A³. The element A³ consists of a roller section 38 and an arcuate section 39 of slightly enlarged radius thereon. The roller section 38 is connected by a pair of flexible elements F⁷ with a supporting track 40 formed in a scale beam housing 41. The track 40 is cut away at its sides, as indicated at 42 in Figure 5, to clear a pair of supporting arms 43 (see Figures 3 and 4) extending from a tube 44. The tube 44 is rotatable on a tube 45 extending from the housing 29, for leveling purposes, and a clamp screw 44ᵃ is provided to hold the scale beam housing 41 in any adjusted position on the tube 45. The housing 41 is pivoted by studs 47 and 48 with respect to the arms 43, as shown in Figure 5. The stud 48 is provided with a lock nut 49 to retain the housing 41 in its adjusted position with respect to the tube 44 and its arms 43. Lock nuts 46 are provided for a further adjustment, as will hereinafter appear.

A pair of flexible elements F⁸ connects the portion 33 of the arcuate element A³ with an arcuate portion A⁴ of a scale beam 50. The scale beam is supported by a flexible element F⁹ secured as to a bracket 51 in the housing 41. The weight of that portion of the scale beam to the right of the flexible element F⁹ retains the elements F⁸ taut with the rocker A³ in contact with the bottom of the track 41 for rocking coaction therewith. A pair of adjusting screws 52 is provided for the flexible elements F⁸.

Within the scale beam housing 41, a plumb line 53 is secured as to an ear 54 and supports a plumb bob 55. An indicating point 56 on a bracket 57 serves to indicate when the housing 41 is in a level position.

On the drawings, I have shown two pairs of the housings H. For longer trucks, additional pairs may be provided.

Surrounding each post P is a slidable secondary wedge 58 (see Figure 7). Secured in the wedge 58 are three rods 59 extending into a pressure housing 60. The secondary wedges 58 are adapted for actuating primary wedges 61 which are slidably mounted on the plate 17 and urged toward a central position by springs 62ᵃ. The outer ends of the wedges 61 are V-notched for coaction with wedge engaging portions 62 of the housing H. To exclude foreign matter from the wedges, rubber sleeves 17ᵃ are provided.

In each pressure housing 60, a diaphragm 63 is connected with the three rods 59. The housing 60 is divided into an upper space 64 and a lower space 65. The spaces 64 and 65 are connected as by copper tubes 66 and 67, respectively, with a four-way control valve 68, shown diagrammatically in Figure 6. The valve 68 has a vent 69 to atmosphere and a vacuum connection 70 to the intake manifold of the truck on which my scale structure is mounted.

Practical operation

In the operation of my vehicle scale structure, the primary wedges 61 are normally in the locked position of Figure 6, tightly engaging the wedge-engaging portions 62 of the housings H under pressure of springs 71 on the rods 59 plus atmospheric pressure on top of the diaphragm 63 caused by connection of the space 65 with the intake manifold. The valve 68 would be in the dotted position illustrated. In this position the housings H, and accordingly the load supporting platform 14, are rigidly mounted with respect to the chassis 10—12. The load can accordingly be transported without its weight being imposed on the scale mechanism.

When it is desirable to weigh the load on the vehicle, the valve 68 is moved to the full line position shown in Figure 6, which permits air to enter through the vent 69 to the space 65 and withdraws air from the space 64, due to the action of the intake manifold. This will cause the diaphragm 63 to rise for raising the secondary wedges 58 and permitting the spring 62a to move the primary wedges 61 to unlocked position, as shown in Figure 7. As soon as the wedges are unlocked, the load is imposed on the scale mechanism through the housings H, flexible elements F², arcuate elements A¹ and flexible elements F¹ suspended from the rockers R¹ which are mounted on the rigid posts P. Such load will tend to cause the arcuate element A¹ of Figure 6 to rotate counterclockwise, thereby pulling on the flexible elements F³ to rotate the rock shaft 34 clockwise. The flexible elements F⁶ thereupon tend to rotate the arcuate elements A³ counterclockwise and through the flexible elements F⁸ raise the scale beam 50.

The scale beam housing 41 is leveled up by releasing the lock nuts 46 to rock the housing 41 toward or away from the operator, and the nut 49 is loosened to rock the housing 41 clockwise or counterclockwise, as the case may be, in order to level the housing in accordance with the plumb bob 55 and the indicating mark 56. Thereafter, the lock nuts 46 and the lock nut 49 are tightened. The scale beam weights 72 (see Figure 2) may now be adjusted to determine the weight of the load. Thereafter the valve 68 may be reversed, to the dotted position of Figure 6 again, for locking the load with respect to the chassis.

The adjustments at 31, 46 and 52 make it possible to position the various elements of the scale system for proper operation. The screws 31 take care of any change necessary in the length of the flexible elements F³. The nuts 46 may be run along the tube 45 for taking care of the required distance for the flexible element F⁶. Finally, the adjusting screw 52 for the element F⁸ completes the necessary adjustments to get all parts of the scale mechanism to operate in their proper ranges.

From the foregoing description, it is obvious that I have provided scale mechanism which can be readily built into a housing and tube frame for supporting the load, the frame being selectively made rigid with respect to the chassis or floating thereon for weighing operations. The scale beam may be leveled up to compensate for an uneven surface on which the truck stands, and the rocker system with the rockers R¹ and R² mounted for rocking on axes at right angles to each other permit the load to hang without binding of the flexible elements when the truck is on a surface that is not level. In all positions, the weight is accurately transmitted to the scale beam.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A scale structure for vehicles comprising a plurality of supporting posts rigidly mounted on the chassis of the vehicle, a load supporting frame, connections between said frame and posts comprising, at each post, a rocker on the post mounted to rock on a horizontal axis, a flexible element depending from said rocker, an arcuate element supported by said flexible element, a second flexible element depending from said arcuate element, and a second rocker supported by said second flexible element, said second rocker being adapted to rock on a horizontal axis at right angles to the axis of said first rocker; a second arcuate element pivotally mounted on the chassis, a flexible element for supporting said last arcuate element relative to the chassis, flexible element connections between said first arcuate elements and said second arcuate element to operate the second one from the first ones in accordance with the load on said frame; a scale beam having an arcuate portion, a flexible element supporting said arcuate portion of said scale beam, said scale beam being connected with said second rocker, said operative connection comprising a third arcuate element, flexible element connections between said second and third arcuate elements and between said third arcuate element and said arcuate portion of said scale beam, a track for said third arcuate element, and a flexible element connecting said track and said third arcuate element.

2. A scale structure for vehicles comprising a plurality of supporting posts rigidly mounted on the chassis of the vehicle, a load supporting frame, connections between said frame and posts comprising, at each post, a rocker on the post mounted to rock on a horizontal axis, a flexible element depending from said rocker, an arcuate element supported by said flexible element, a second flexible element depending from said arcuate element, and a second rocker supported by said second flexible element, said second rocker being adapted to rock on a horizontal axis at right angles to the axis of said first rocker; a second arcuate element pivotally mounted on the chassis, a flexible element for supporting said last arcuate element relative to the chassis, flexible element connections between said first arcuate elements and said second arcuate element to operate the second one from the first ones in accordance with the load on said frame, and a scale beam operatively connected with said second arcuate element.

3. A scale structure for vehicles comprising a plurality of supporting posts rigidly mounted on the chassis of the vehicle, a load supporting frame, connections between said frame and posts comprising at each post a rocker on the post mounted to rock on a horizontal axis, a flexible element depending from said rocker, an arcuate element supported by said flexible element, a second flexible element depending from said arcuate element, a second rocker supported by said second flexible element, said second rocker being adapted to rock on a horizontal axis at right angles to the axis of said first rocker, and a scale beam operatively connected with said arcuate element.

4. A scale structure for vehicles comprising pairs of supporting posts rigidly mounted on the chassis of the vehicle, a load supporting frame, connections between said frame and posts comprising at each post a rocker on the post mounted to rock on a horizontal axis, a flexible element depending from said rocker, an arcuate element supported by said flexible element, a second flexible element depending from said arcuate element, a second rocker supported by said second flexible element, said second rocker being adapted to rock on a horizontal axis at right angles to the axis of said first rocker, a scale beam having an arcuate portion, a flexible element supporting said arcuate portion of said scale beam, said scale beam being operatively connected with said first arcuate element, said operative connection including a second arcuate element, flexible element connections between said second and first arcuate elements and flexible element connections between said second arcuate element and said arcuate portion of said scale beam, a housing for said scale beam, a track therein for said second arcuate element, and a flexible element connecting said track and second arcuate element.

5. A scale structure for vehicles comprising pairs of supporting posts rigidly mounted on the chassis of the vehicle, a load supporting frame, connections between said frame and posts comprising at each post a rocker on the post mounted to rock on a horizontal axis, a flexible element depending from said rocker, an arcuate element supported by said flexible element, a second flexible element depending from said arcuate element, and a second rocker supported by said second flexible element, said second rocker being adapted to rock on a horizontal axis at right angles to the axis of said first rocker; a second arcuate element pivotally mounted on the chassis, a flexible element for supporting said last arcuate element relative to the chassis, flexible element connections between said first arcuate elements and said second arcuate element to operate the second one from the first ones in accordance with the load on said frame, a scale beam, a flexible element supporting said scale beam, said scale beam being operatively connected with said second rocker, said operative connection including a third arcuate member, and flexible element connections between said second and third arcuate elements and between said third arcuate element and said scale beam.

6. A scale structure for vehicles comprising a plurality of supporting posts rigidly mounted on the chassis of the vehicle, a load supporting frame, connections between said frame and posts comprising at each post a rocker on the post mounted to rock on a horizontal axis, a flexible element depending from said rocker, an arcuate element supported by said flexible element, a second flexible element depending from said arcuate element, a second rocker supported by said second flexible element, said second rocker being adapted to rock on a horizontal axis at right angles to the axis of said first rocker, said frame including housings for said arcuate elements, flexible elements and rockers, means for selectively locking said housing relative to said posts, a scale beam having an arcuate portion, and a flexible element supporting said arcuate portion of said scale beam, said scale beam being operatively connected with said second rocker.

7. A scale structure for vehicles comprising a pair of supporting posts rigidly mounted on the front of the chassis of the vehicle, a pair of supporting posts rigidly mounted on the rear of the chassis, a load supporting frame, connections between said frame and posts comprising at each post a rocker on the post mounted to rock on a transverse horizontal axis, a flexible element depending from said rocker, an arcuate element supported by said flexible element, a second flexible element depending from said arcuate element, a second rocker supported by said second flexible element, said second rocker being adapted to rock on a longitudinal horizontal axis, a scale beam, and flexible elements connecting said scale beam with said second rockers.

8. A scale structure for vehicles comprising a plurality of rockers mounted to rock on a horizontal axis which is rigid relative to the chassis of the vehicle, a load supporting frame, connections between said frame and rockers comprising at each rocker a flexible element depending therefrom, an arcuate element supported by said flexible element, a second flexible element depending from said arcuate element, a second rocker supported by said second flexible element, said second rocker being adapted to rock relative to said frame on a horizontal axis at right angles to the axis of said first rocker, a scale beam, and flexible elements connecting said scale beam with said second rocker.

9. A scale structure for vehicles comprising a plurality of supporting posts rigidly mounted on the chassis of the vehicle, a load supporting frame, connections between said frame and posts including flexible elements depending from said posts and an arcuate element supported thereby, second flexible elements depending from said arcuate elements, second rockers supported by said second flexible elements and adapted to rock relative to said frame, a scale beam having an arcuate portion, and a flexible element supporting said arcuate portion of said scale beam, said scale beam being connected by flexible elements with said second rockers.

10. A scale structure for vehicles comprising a plurality of supporting posts rigidly mounted on the chassis of the vehicle, a load supporting frame, said frame having a wedge engageable portion adjacent each post, a primary wedge carried by each post, means to engage said primary wedge with said wedge engaging portions of said frame to lock said frame against movement relative to said posts and chassis, said means comprising a secondary wedge slidable on said post and engaging said primary wedge to slide it into engagement with said wedge engaging portion when said secondary wedge is moved, means for moving said secondary wedge comprising a pressure operated device connected with the intake manifold of the vehicle, a valve for controlling the connections between said pressure operated device and said manifold, connections between said frame and posts comprising, at each post, a rocker on the post mounted to rock on a horizontal axis, a flexible element depending from said rocker, an arcuate element supported by said flexible element, a second flexible element depending from said arcuate element, and a second rocker supported by said second flexible element, said second rocker being adapted to rock on a horizontal axis at right angles to the axis of said first rocker; a second arcuate element pivotally mounted on the chassis, a flexible element for supporting said last arcuate element relative to the chassis, flexible element connections between said first arcuate elements and said second arcuate element to operate the second one from the first ones in accordance with the load on said frame, a scale beam having an arcuate portion, a flexible element supporting said arcuate portion of said scale beam, said scale being connected with said second rocker, said operative connection comprising a third arcuate element, flexible element connections between said second and third arcuate elements and between said third arcuate element and said arcuate portion of said scale beam, a track for said third arcuate element, and a flexible element connecting said track and third arcuate element.

11. A scale structure for vehicles comprising a plurality of supporting posts rigidly mounted on the chassis of the vehicle, a load supporting frame, said frame having a wedge engageable portion adjacent each post, a wedge carried by each post, means to engage said wedge with said wedge engaging portion of said frame to lock said frame against movement relative to said posts, said means comprising a pressure operated device connected with the intake manifold for the vehicle, a valve for controlling the connections between said pressure operated device and said manifold, connections between said frame and posts comprising at each post a rocker on the post mounted to rock on a horizontal axis, a flexible element depending from said rocker, an arcuate element supported by said flexible element, a second flexible element depending from said arcuate element, and a scale beam having an arcuate portion, a flexible element supporting said arcuate element of said scale beam, said scale beam being connected with said second flexible element to operate said scale beam therefrom.

12. A scale structure for vehicles comprising a plurality of supporting posts rigidly mounted on the chassis of the vehicle, a load supporting frame, said frame having a wedge engageable portion adjacent each post, a wedge slidably carried by each post, means to engage said wedges with said wedge engaging portions of said frame to lock said frame against movement relative to said posts and chassis, a pressure operated device connected with the intake manifold of the vehicle, a valve for controlling the connections between said pressure operated device and said manifold, connections between said frame and posts comprising at each post flexible elements depending from the posts, arcuate elements supported by said flexible elements, second flexible elements depending from said arcuate elements and connected with said frame, and a scale beam connected with said arcuate elements.

13. A scale structure for vehicles comprising a plurality of supporting posts rigidly mounted on a vehicle chassis, a load supporting frame having a wedge engageable portion adjacent each post, a wedge carried by each post, means to engage said wedges with said wedge engaging portions of said frame to lock said frame against movement relative to said chassis, connections between said frame and posts comprising, at each post, a rocker on the post mounted to rock on a horizontal axis, a flexible element depending from said rocker, an arcuate element supported by said flexible element, a second flexible element depending from said arcuate element, and a second rocker supported by said second flexible element, said second rocker being adapted to rock on a horizontal axis at right angles to the axis of said first rocker; a second arcuate member pivotally mounted on the chassis, a flexible element for supporting said last arcuate element relative to the chassis, flexible element connections between said first arcuate elements and said second arcuate element to operate the second one from the first ones in accordance with the load on said frame, a scale beam connected with said second rocker member, and means for leveling said scale beam.

14. A scale structure for vehicles comprising a plurality of supporting posts rigidly mounted on the chassis of the vehicle, a load supporting frame comprising housings over said posts and tubes connecting said housings together, said housings having wedge engageable portions, a wedge carried by each post, means to engage said wedges with said wedge engaging portions of said housings to lock said frame against movement relative to said chassis, flexible connections at each post between said frame and the posts, an arcuate element supported by each flexible connection, and a scale beam connected with said arcuate elements, the connection comprising flexible elements extending through said tubes.

15. A scale structure for vehicles comprising a plurality of supporting posts rigidly mounted on the chassis of the vehicle, a load supporting frame, said frame having a wedge engageable portion adjacent each post, a primary wedge carried by each post, means to engage said primary wedges with said wedge engaging portions of said frame to lock said frame against movement relative to said posts and chassis, connections between said frame and posts comprising at each post a rocker on the post mounted to rock on a horizontal axis, a flexible element depending from said rocker, an arcuate element supported by said flexible element, a second flexible element depending from said arcuate element, a second rocker supported by said second flexible element, said second rocker being adapted to rock on a horizontal axis at right angles to the axis of said first rocker, a scale beam connected with said second rocker, and means for adjusting said scale beam with respect to said chassis to level the scale beam.

16. A scale structure for vehicles comprising a plurality of supporting posts rigidly mounted on the chassis of the vehicle, a load supporting frame, selectively operable wedge means to lock said frame against movement relative to said posts and chassis, connections between said frame and posts comprising at each post a rocker on the post mounted to rock on a transverse horizontal axis, a flexible element depending from said rocker, an arcuate element supported by said flexible element, a second flexible element depending from said arcuate element, a second rocker supported by said second flexible element, said second rocker being adapted to rock on a longitudinal horizontal axis, a scale beam having an arcuate portion, and a flexible element supporting said arcuate portion, said scale beam being operatively connected with said second rocker.

17. A scale structure for vehicles comprising a plurality of supporting posts rigidly mounted on the chassis of the vehicle, a load supporting frame having housings over said posts, selectively operable wedge means to lock said frame against movement relative to said posts, connections between said housings and posts comprising in each housing a rocker pivoted on the post, a flexible element depending from said rocker, an arcuate element supported by said flexible element, a second flexible element depending from said arcuate element, a second rocker supported by said second flexible element, said second rockers being pivoted in said housings, and a scale beam, said scale beam being connected with said second rocker member for operation therefrom.

18. A scale structure for vehicles comprising a plurality of supporting posts rigidly mounted on the chassis of the vehicle, a load supporting frame, said frame having a wedge engageable portion adjacent each post, wedge means slidably carried by each post, means to engage said wedge means with said wedge engageable portions, connections between said frame and posts comprising at each post a rocker on the post mounted to rock on a horizontal axis, a flexible element depending from said rocker, an arcuate element supported by said flexible element, a second flexible element depending from said arcuate element, a second rocker supported by said second flexible element, said second rocker being adapted to rock on a horizontal axis at right angles to the axis of said first rocker, a scale beam, and means for connecting said second rocker member to said scale beam.

DONALD J. ORR.